(No Model.)
F. W. WRIGHT.
HOSE OR PIPE COUPLING.
No. 464,146. Patented Dec. 1, 1891.
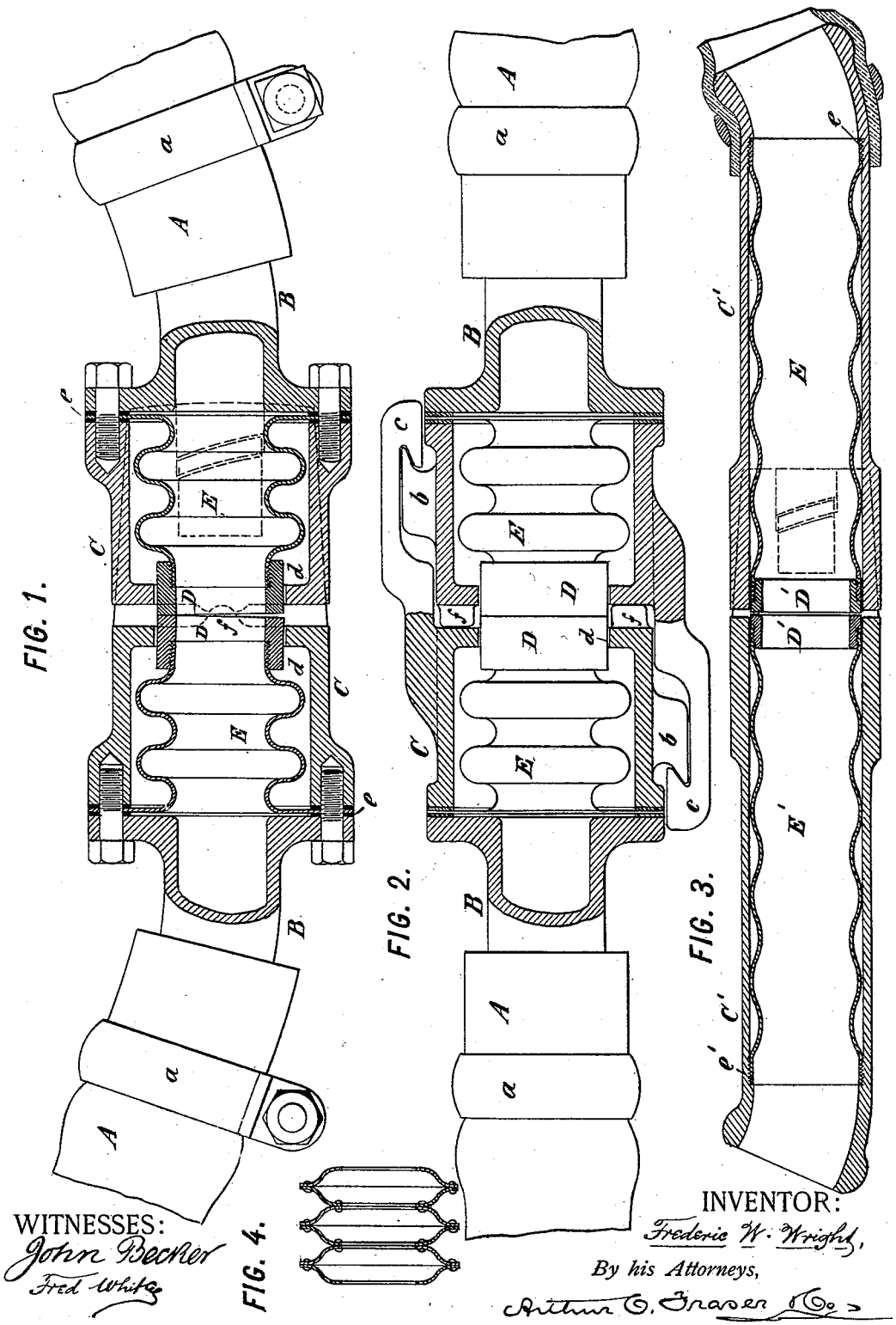
WITNESSES:
John Becker
Fred White
INVENTOR:
Frederic W. Wright,
By his Attorneys,
Arthur E. Fraser & Co.

UNITED STATES PATENT OFFICE.

FREDERIC W. WRIGHT, OF NEW YORK, N. Y.

HOSE OR PIPE COUPLING.

SPECIFICATION forming part of Letters Patent No. 464,146, dated December 1, 1891.

Application filed April 11, 1891. Serial No. 388,454. (No model.)

*To all whom it may concern:*

Be it known that I, FREDERIC W. WRIGHT, a citizen of the United States, residing in the city, county, and State of New York, have invented certain new and useful Improvements in Hose or Pipe Couplings, of which the following is a specification.

This invention relates to coupling devices for uniting sections of hose or other pipe together, being specially designed for coupling the terminal hose-lengths of steam-heating pipes of railway-cars, while applicable also to other purposes.

The principal object of my invention is to provide a hose-coupling wherein the seating-faces of the coupling will be pressed together automatically upon the turning on of steam or other fluid under pressure and will draw apart and form a drip opening or space for discharging water when the steam or other fluid is turned off. My improved coupling is designed thus to serve both as a coupling and as a drainage-trap for discharging water of condensation. To this end I construct the coupling with interlocking coupling-heads independent of the seats, and I connect the seats to the head through the medium of an expansible tubular member adapted to expand under either heat or pressure, or both, so that after the heads are locked together the turning on of steam will expand such expansible member and thereby force the two seats together so tightly as to resist the pressure of steam and prevent leakage.

Figure 1 of the accompanying drawings is a vertical longitudinal mid-section of my improved coupling. Fig. 2 is a plan thereof, the coupling-heads being partly in horizontal section. Fig. 3 is a longitudinal vertical mid-section showing a modified construction.

The end of each length of hose A is fastened by a clamp $a$ or in any other suitable way to a tubular neck, thimble, or shank B, which is fastened to or forms part of the coupling-head C. The two heads are provided with any suitable mechanical means known to the art for locking them together. One such means is shown in the drawings, consisting of the lateral projection $b$ at one side of each head engaged by the hooked end of an arm $c$ on the other head, the engaging faces of the projections $b$ and $c$ being eccentric, so that as the two coupling-heads are rocked relatively to one another their engaging faces wedge together and lock the two heads firmly to one another. This is a well-known construction of locking device for couplings and need not be more particularly described, as it is not essential to my invention, since any suitable mechanical locking device for drawing or fastening two heads together may be substituted.

Carried by each coupling-head is a seat D, consisting of a ring arranged in the axis of the head and projecting slightly beyond its end, the projecting end of the ring being formed in a true plane in order to seat tightly against the corresponding seating-face of the opposite seat. Each seat passes freely through a hole $d$ in the end of the coupling-head and is otherwise connected to the head only through the medium of an intervening expansible member or diaphragm E. In the construction shown in Figs. 1 and 2 this intervening member consists of a corrugated tube of thin and elastic or yielding material—such as spun brass, for example. This is preferably made in one piece, but might consist of a series of annular diaphragms, as shown in Fig. 4. All that is essential is that this member shall be longitudinally expansible and shall expand longitudinally under the influence of either pressure or heat, or both, preferably chiefly by pressure. The construction shown in Figs. 1 and 2 is well adapted to this purpose. The seat D is fastened to one end of this expansible member, which may be effected by screwing it thereonto, as shown, and the other end of the member is fastened either to the head C or to the neck B, preferably by forming it with a projecting flange $e$ and clamping this flange between flanges on the neck and head, any suitable packing being interposed to make a tight joint.

When the two heads are locked together, and before steam is turned on, the seating-faces stand slightly apart, as shown in Fig. 1. In order that the heads may be locked tightly together without thereby forcing the seats into intimate contact, the heads are arranged to come together at their abutting faces.

This may advantageously be accomplished by forming a projection *f* on one side of each head, which, when the heads are locked together, comes against the face of the opposite head. The seats may advantageously be constructed with their seating-faces slightly out of perpendicular to the axis of the head, so that they incline toward each other and consequently touch at their upper sides, while gapping slightly open beneath, as shown. When steam is turned on, this pressure, acting to force apart the convolutions of the diaphragms E E, causes them to elongate and force the seats D D tightly together, the diaphragms yielding sufficiently to bring the two seating-faces into contact at all points. The expansion of the diaphragms E E by the heat imparted to them by the steam also contributes to this result; but it is due chiefly and most immediately to the effect of the pressure. The greater the steam-pressure the more tightly the seats are forced together and the more effectively they resist leakage. When steam is turned off, the expansible members E E instantly contract upon the relieving of the pressure, and thereby open the seats D D slightly apart again at their lower sides, as shown in Fig. 1, thereby permitting any water of condensation that may run down into the pendent portions of the hose to flow out through the trap and through the drainage-space between the seating-faces. My improved coupling thus acts automatically as a trap to drain the steam-pipes. The trap thus formed opens quickly on the cessation of the pressure, thereby discharging the condensed water while it is still hot, so that it runs out before it has time to freeze.

Another advantage of my invention is that by the yielding or flexure of the expansible members E E the seats are brought tightly together, even though by reason of wear or misfitting they would not otherwise or if rigidly mounted make a tight joint. Thus my invention is applicable as a means for causing the seating-faces of pipe-couplings to yield to and compensate for one another, and thereby make a tight joint either by the forcing together of the heads or by the subsequent expansive action of the steam or other fluid under pressure.

The feature of utilizing the coupling as a drainage-trap is not essential to my invention, as by a slight change of proportion the seats D D may be forced together in the act of uniting the coupling-heads. In such case the expansible diaphragms E E become virtually an elastic backing for the seats to the same effect as though the seats were mounted against a cushion of rubber. My improved seats (themselves preferably inelastic) with their diaphragms E E may consequently be substituted for compressible or elastic seats or so-called "composition seats," as heretofore used. In such case the diaphragms E E have the advantage, not possessed by such composition seats, of forcing the seating-faces tighter together as the internal fluid-pressure is increased.

Fig. 3 shows a modification in which the expansible member (here lettered E') is caused to expand solely or chiefly by heat and slightly or not at all by the fluid-pressure. The neck or thimble B and head C of the coupling are here constructed both in one piece, (lettered C',) which is considerably elongated as compared with the construction first described. Within this elongated head is fastened the expansible member E', which is fastened at its inner end to the head by screwing, as shown at *e'*, or by other means, and at the outer end of the head is screwed or otherwise fastened to the seat D', which projects slightly beyond the end of the head. When the coupling-heads are first united, the two seats D' D' stand slightly out of contact, as shown, so that the space between them may serve for drawing off water of condensation; but as steam is turned on its heat causes the expansive members E' E' to expand longitudinally, so that they force the two seats tightly together. To accomplish this the expansive members are made of a metal or material which has a greater coefficient of expansion than the metal of the heads C'. For example, the heads may be made of cast-iron and the expansion-tubes of copper. These expansion-tubes may, with good advantage, be slightly corrugated, as shown; but this is not essential.

I claim as my invention the following-defined novel features or combinations, substantially as hereinbefore specified, namely:

1. The combination, with a coupling-head and seat, of an intervening expansible member fastened to the head and seat, respectively, and adapted to expand under heat or pressure to force the seat outward, whereby when coupled the seat is caused to make a tight joint with the seat of the opposite coupling-head.

2. The combination of a pair of interlocking coupling-heads and their seats with an expansible member interposed between each seat and its head, fastened to the head and seat, respectively, adapted to expand under heat or pressure to force the seat outwardly, and the parts being so proportioned that when the heads are coupled together and the expansible members are contracted the seats are held slightly apart, whereby on applying heat or pressure the seats are forced together to make a tight joint.

3. The combination, with a coupling-head and seat, of an intervening elastic diaphragm fastened to the head and seat, respectively, and adapted to exert an elastic pressure to force the seat outward when coupled.

4. The combination of a coupling-head, a seat working loosely through an opening therein, and an expansible member consisting of a corrugated tubular diaphragm fastened at one end to said seat and at the other end to said head.

5. The combination of a hollow coupling-head forming an inclosing shell and comprising a tubular neck for attachment to a hose, a seat working loosely through an opening in said head, and a corrugated tubular diaphragm inclosed within the head, fastened at its front end to said seat and at its rear end to said head, and arranged with its interior communicating with the interior of said tubular neck.

In witness whereof I have hereunto signed my name in the presence of two subscribing witnesses.

FREDERIC W. WRIGHT.

Witnesses:
ARTHUR C. FRASER,
GEORGE H. FRASER.